United States Patent

Nagayama et al.

[15] 3,666,797
[45] May 30, 1972

[54] METHOD OF PREPARING LIGHT-COLORED PARAFFIN SULFONIC ACID

[72] Inventors: Masuzo Nagayama, Tokyo; Terunosuke Kawana, Funabashi-shi, both of Japan

[73] Assignee: Lion Fat & Oil Co., Ltd., Tokyo, Japan

[22] Filed: Nov. 14, 1969

[21] Appl. No.: 877,013

[30] Foreign Application Priority Data

Nov. 20, 1968  Japan.....................................43/84770

[52] U.S. Cl. .........................................................260/513 R
[51] Int. Cl............................................................C07c 143/02
[58] Field of Search ..............................................260/513 R

[56] References Cited

UNITED STATES PATENTS

| | | | |
|---|---|---|---|
| 3,485,870 | 12/1969 | Bost | 260/513 R |
| 3,424,693 | 1/1969 | Stein et al. | 260/513 R |
| 3,372,188 | 3/1968 | Alston et al. | 260/513 R |

FOREIGN PATENTS OR APPLICATIONS

| | | | |
|---|---|---|---|
| 902,614 | 1/1954 | Germany | 260/513 R |
| 1,052,484 | 12/1966 | Great Britain | 260/513 R |
| 65,919 | 3/1969 | Germany | 260/513 R |

*Primary Examiner*—Daniel D. Horwitz
*Attorney*—Woodhams, Blanchard and Flynn

[57] ABSTRACT

A method of preparing a light-colored paraffin sulfonic acid comprising the steps of separating a heavy layer containing paraffin sulfonic acid from an reacted mixture obtained through sulfoxidation reaction of paraffin and concentrating said heavy layer, wherein the concentration of the heavy layer is carried out in the presence of hydrogen peroxide.

7 Claims, No Drawings

METHOD OF PREPARING LIGHT-COLORED PARAFFIN SULFONIC ACID

BACKGROUND OF THE INVENTION

1. Field of the Invention

The present invention relates to an improved method of sulfoxidation which is capable of producing a light-colored paraffin sulfonic acid. To be precise, it relates to a method of preparing a paraffin sulfonic acid while preventing the coloring of the sulfoxidation reaction product in the course of its purification.

2. Description of the prior art

Paraffin sulfonic acid is obtained by causing sulfur dioxide gas to react on n-paraffin or a branched paraffin having a carbon atom number in the range of 10 – 20 in the presence of oxygen and at a temperature in the range of 0° – 80° C. As for said sulfoxidation reaction, the well-known methods include one employing gamma rays as the reaction initiator such as British Pat. No. 810,574, one employing ultraviolet rays as said initiator such as Japanese Pat. No. 160,811, one employing a peroxide as the initiator such as Belgian Pat. No. 445,312, one employing an azo compound as the initiator such as the U.S. Pat. No. 2,503,280, etc., and, in any of these methods, the reaction progresses by the same mechanism. In case where the sulfoxidation reaction is effected with an anhydrous system, colored substances attributable to a secondary reaction are apt to be coincidentally produced. There are instances where water is added as a means of preventing such secondary reaction. In case where said reaction is effected in the presence of water, the reacted mixture itself may be light-colored, but inasmuch as such after-treatment as concentration is required for removing the by-product sulfuric acid, the desired end product tends to be colored. For instance, such a method as the light-water process disclosed in Belgian Pat. No. 709,864 includes a concentration step, but the end product obtained thereby is remarkably colored.

The fact that sulfuric acid is produced as a by-product even in case where no water is employed may be evident from the reaction sequence described below.

$RH + SO_2 + \frac{1}{2}O_2 \rightarrow RSO_2OH$ (wherein R represents paraffin hydrocarbon radical.)

The sulfoxidation reaction of paraffin expressed by the foregoing general reaction formula progresses in terms of radicals as follows.

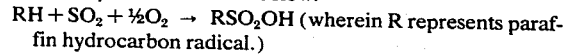
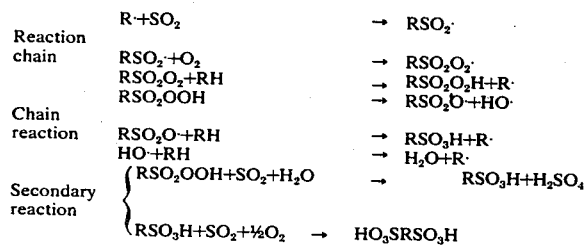
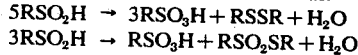

As seen even from the foregoing radical reaction formula, the product of sulfoxidation reaction usually contains sulfuric acid produced by the secondary reaction, and the amount of said by-product sulfuric acid is in the range of about ⅛ mol per 1 mol of the sulfonic acid produced in case where the reaction system is maintained in a substantially anhydrous state, whereas, in case of the state in which water is contained sufficiently in the reaction system, sulfuric acid is produced as a byproduct in an amount equivalent to the sulfonic acid produced in terms of mols.

Meanwhile, the paraffin sulfonic acid obtained through the sulfoxidation reaction is often employed for various uses usually upon altering it into the sulfonate. On the occasion of altering said sulfonic acid into sulfonate by means of neutralization, if there exists any sulfuric acid, said sulfuric acid also changes into a sulfate simultaneously. But, in general, the existence of sulfate mixed with the sulfonate is undesirable, and particularly in case where paraffin sulfonate is utilized as the base of a light-duty liquid detergent, it is considered desirable to have the least possible amount of sulfate mixed therein.

For such reason, the reaction mixture obtained through sulfoxidation, which contains paraffin sulfonic acid, has hitherto been subjected to a treatment for removing the by-product sulfuric acid existing therein. That is, according to the conventional method of removing the by-product sulfuric acid, the phase separation of the reaction mixture is effected by means of either adding water to the reaction system in advance or adding water to the reaction mixture resulting from sulfoxidation, and then a heavy layer containing paraffin sulfonic acid is first separated from the layer comprising the unreacted paraffin as the main constituent thereof. Subsequently, said heavy layer is either concentrated and thereafter, left standing, or further heated and thereafter left standing at a high temperature. This method is capable of removing more than 80 percent of the by-product sulfuric acid.

However, the paraffin sulfonic acid thus separated from the by-product sulfuric acid is remarkably colored as stated above, and, to make it worse, such coloring can hardly be lightened even by a bleaching treatment.

SUMMARY OF THE INVENTION

One object of the present invention is to provide an improved method of preparing paraffin sulfonic acid which comprises the steps of separating a heavy layer containing paraffin sulfonic acid from the reaction mixture obtained through the sulfoxidation reaction of paraffin and concentrating the heavy layer thus separated, said concentration being effected by means of adding hydrogen peroxide to said heavy layer.

Another object of the present invention is to provide a light-colored paraffin sulfonate suitable for use as the base of a light-duty liquid detergent.

When the cause of the coloring of the paraffin sulfonic acid to be obtained through the conventional method is examined, the coloring is considered attributable to the treatment per se for removing the by-product sulfuric acid from the heavy layer in the light of the fact that an extremely light-colored heavy layer can be obtained according to the conditions for reaction in said sulfoxidation. When the heavy layer is examined from this point of view, said layer is expected to contain sulfinic acid, and it is considered that said sulfinic acid may give rise to a disproportionation reaction such as:

$5RSO_2H \rightarrow 3RSO_3H + RSSR + H_2O$
$3RSO_2H \rightarrow RSO_3H + RSO_2SR + H_2O$ — because of its instability, on the occasion of the heavy layer being concentrated or heated, and that the product from said reaction becomes a portion or the main constituent of the coloring component or the stench-generating component of the paraffin sulfonic acid due to further decomposition of said product and so forth.

The present invention has been proved successful in producing an extremely light-colored paraffin sulfonic acid by means of previously adding an oxidizing agent for sulfinic acid to the heavy layer on the occasion of removing the by-product sulfuric acid from said heavy layer. In other words, the method of preparing a paraffin sulfonic acid according to the present invention comprises the steps of adding hydrogen peroxide to the heavy layer separated from the reaction mixture prepared by sulfoxidation of paraffin and said heavy layer is concentrated in the presence of said hydrogen peroxide.

The unstable sulfinic acid contained in the heavy layer is stabilized as it is altered into sulfonic acid by virtue of hydrogen peroxide added thereto, and the aforesaid product resulting from the decomposition of the product from a disproportionation reaction is coincidentally decolored and deodorized through oxidation by said hydrogen peroxide. According to the present invention, therefore, it is possible to produce a less fetid and light-colored paraffin sulfonic acid. And, in case of a paraffin sulfonic acid to be obtained through concentration in the presence of hydrogen peroxide and giving out a complicated, offensive smell accompanied by a smell like a low-grade carboxylic acid, said smell can be eliminated by means of steam distillation of said sulfonic acid under either acidic conditions or neutral conditions. It is to be noted that said steam distillation is conspicuously effective as a means of deodorization.

According to the method under the present invention, the sulfoxidation reaction of paraffin is not subjected to any particular limitation. As the material paraffin, therefore, any one of n-paraffins or branched paraffins having a carbon atom number of 10–20 which are obtained from the kerosene fraction of petroleum and the like by the molecular sieve method or the urea-adducting method is applicable. As to the conditions for reaction, too, any appropriate conditions may be used. For instance, there may be employed a reaction initiator such as described in the foregoing, a reaction accelerator, or water for the purpose of controlling the secondary reactions.

The adding of hydrogen peroxide to the heavy layer may be carried out by dissolving said hydrogen peroxide in water or other appropriate solvent. However, the amount of hydrogen peroxide to be added is in the range of 0.01–10 percent by weight of sulfonic acid contained in the heavy layer, and it is particularly advisable to be in the range of 0.1–5 wt percent. The temperature, the pressure and the period of time required for the adding of hydrogen peroxide are usually 0°–180° C, atmospheric pressure to several atmospheres pressure and 5 min. to several hours, respectively, but are not necessarily limited thereto. Further, the state of the heavy layer at the time when hydrogen peroxide is added is suitable if it is such that it will permit a thorough mixing with hydrogen peroxide, and it may be in the liquid state, slurry state or paste state. But, it is desirable to expel sulfur dioxide gas existing in the heavy layer, prior to adding hydrogen peroxide thereto, by means of heating said layer at a temperature of more than 50° C.

According to the method under the present invention, the paraffin sulfonic acid can be separated from the by-product sulfuric acid, without causing any coloring of the former, through concentration of the heavy layer in the presence of hydrogen peroxide, but it is desirable that hydrogen peroxide be contained in the heavy layer subsequent to said concentration. Therefore, hydrogen peroxide is further added to the heavy layer subsequent to concentration thereof and/or separation of the by-product sulfuric acid therefrom. The amount of hydrogen peroxide to be added on this occasion is in the range of 0.01–10 wt percent, and this additional employment of hydrogen peroxide can be expected to be all the more effective for preventing coloring and for deodorizing the paraffin sulfonic acid concerned.

The crude paraffin sulfonic acid separated from the by-product sulfuric acid may be subsequently subjected to such treatments as neutralization and removal of unreacted oil, etc., but it goes without saying that the present invention is not intended for specifying these treating method or the conditions thereof. Nevertheless, it is an indisputable fact that, in case where the paraffin sulfonic acid separated from the by-product sulfuric acid is subjected to steam distillation under the condition of pH value being 1.5–8, the paraffin sulfonate resulting therefrom comes to be much less fetid.

DESCRIPTION OF THE PREFERRED EMBODIMENTS

Example 1

In a cylindrical reactor equipped with a lamp jacket for the purpose of internal irradiation was placed n-paraffin having a carbon atom number of 14–17, and sulfoxidation of said paraffin was carried out continuously at 25°–30° C by means of irradiation with a high-pressure mercury lamp while blowing a mixture gas comprising sulfur dioxide gas and oxygen mixed at the volume ratio of 2:1 into the reactor from its bottom. By adding water continuously from the upper part of the reactor, the reacted mixture was extracted, whereby there was obtained a heavy layer having the following composition.

THE COMPOSITION OF HEAVY LAYER

| | |
|---|---|
| Sulfonic acid | 17.1 wt% |
| Sulfuric acid | 6.2 wt% |
| Paraffin | 12.9 wt% |
| Water | 63.8 wt% |

Thus obtained heavy layer was put in a rotary evaporator, subjected to 20 min. concentration under reduced pressure at a bath temperature of 80° C in the presence of the additive such as shown in the following table, and thereafter the state of coloring of the concentrated liquid was measured. The result of the measurement was as shown in the same table. In this connection, the Gardner color of said heavy layer prior to the concentration was 1.

THE STATE OF COLORING OF THE CONCENTRATE

| Additive | Amount of additive employed (wt% as against heavy layer) | Yield of concentrate (wt%) | Gardner color |
|---|---|---|---|
| None | – | 38.2 | >18 |
| BHT* | 0.1 | 39.2 | >18 |
| $NH_2OH \cdot HCl$ | 0.5 | 39.0 | 15 |
| $NaBH_4$ | 0.5 | 39.2 | >18 |
| NaClO | 0.5 | 39.0 | 16 |
| $H_2O_2$ | 0.25 | 39.0 | 3 |
| $H_2O_2$ | 0.5 | 31.8 | 1 |
| $H_2O_2$ | 1.7 | 39.2 | <1 |

*2,6-di-tert-butyl-p-cresol

Example 2

The heavy layer obtained in Example 1 was subjected to 20 min. concentration under reduced pressure at 80° C, and subsequently the resultant concentrate was left standing while maintained at 140° C. The efficiency of hydrogen peroxide employed in the separation of sulfuric acid was as shown in the following table. In this connection, said hydrogen peroxide was employed as a 30 percent aqueous solution thereof.

VARIATION OF THE GARDNER COLOR

| Amount of hydrogen peroxide added | At the end of concentration | After separation of sulfuric acid | Additional employment of $H_2O_2$ (1wt%) |
|---|---|---|---|
| 0 | >18 | >>18 | 6 |
| 0.5 wt% | 1 | 4 | 1 |

Example 3

The heavy layer obtained in Example 1 was maintained at 80° C, and subjected to concentration under reduced pressure by means of a rotary evaporator until the water content became 10 percent by weight of said layer. The Gardner color of thus concentrated heavy layer was more than 18. The Gardner color of said concentrated heavy layer when it was neutralized with 40 percent caustic soda after separation of sulfuric acid therefrom was 11, and the Gardner color when hydrogen peroxide in the amount of 3.0 percent by weight of sulfonate was added to thus neutralized heavy layer was 3.

On the other hand, in case where hydrogen peroxide in the amount of 3 percent by weight of sulfonic acid was previously added to the heavy layer prior to the concentration under reduced pressure, the Gardner color of the concentrated heavy layer obtained after separation of sulfuric acid decreased to 1. And, when this concentrated heavy layer was neutralized with 40 percent caustic soda and then subjected to the steam distillation eliminating the unreacted paraffin and stench-generating components, the Gardner color was 1. As a result, it was possible to obtain a light-colored and less odorous paraffin sulfonate in the state of a paste.

What we claim is:

1. In a process of preparing sulfonic acids which comprises contacting paraffinic hydrocarbon with sulfur dioxide and oxygen in a sulfoxidation reaction to produce a heavy layer of an aqueous phase containing paraffin sulfonic acid, sulfuric acid, unreacted paraffinic hydrocarbon and sulfur dioxide, separating said heavy layer from the remainder of the reaction mixture, and then concentrating said heavy layer to remove sulfuric acid therefrom, the improvement which comprises adding to and mixing with said heavy layer, after it has been separated from the remainder of said reaction mixture and prior to said concentrating step, from 0.01 to 10 percent by weight of hydrogen peroxide, based on the weight of paraffin sulfonic acid in said heavy layer, so that the hydrogen peroxide is present during the concentrating step to minimize the formation of coloring and/or odoriferous substances during the concentrating step.

2. A process according to claim 1, in which water is added to the reaction mixture during the sulfoxidation reaction.

3. A process according to claim 1, in which water is added to the reaction mixture after the sulfoxidation reaction is completed and prior to separation of the heavy layer.

4. A method according to claim 2, in which an additional amount of hydrogen peroxide in an amount in the range of 0.01 ~ 10 percent by weight based on the sulfonic acid present in the heavy layer, is added to and mixed in the heavy layer after the concentrating step.

5. A method according to claim 2, in which the heavy layer, after removal of the sulfuric acid therefrom, is subjected to steam distillation at a pH between 1.5 and 8.

6. A method according to claim 3, in which an additional amount of hydrogen peroxide in an amount in the range of 0.01 ~ 10 percent by weight based on the sulfonic acid present in the heavy layer, is added to and mixed in the heavy layer after the concentrating step.

7. A method according to claim 4, in which the heavy layer, after removal of the sulfuric acid therefrom, is subjected to steam distillation at a pH between 1.5 and 8.

* * * * *